Figure 2:
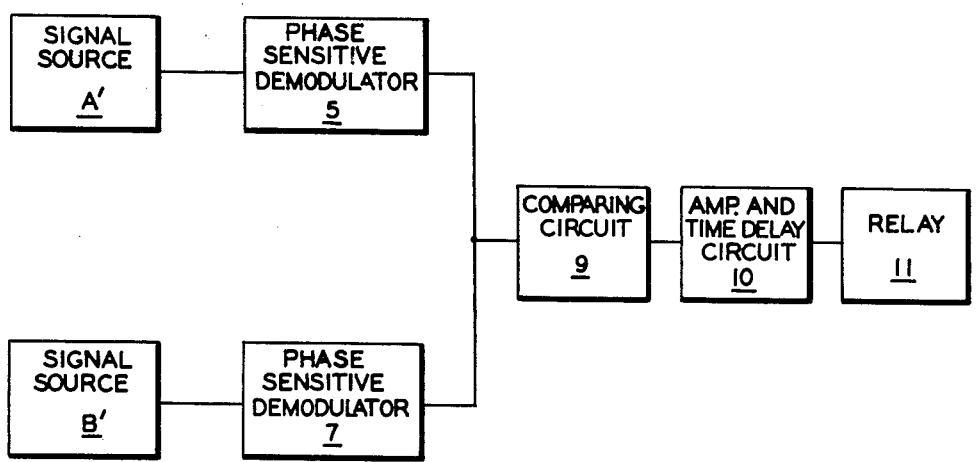

June 6, 1961 F. PRAPIS 2,987,653
SIGNAL COMPARING DEVICE
Filed Oct. 14, 1957

INVENTOR.
FRANK PRAPIS
BY
ATTORNEY

United States Patent Office 2,987,653
Patented June 6, 1961

2,987,653
SIGNAL COMPARING DEVICE
Frank Prapis, Paterson, N.J., assignor to The
Bendix Corporation, a corporation of Delaware
Filed Oct. 14, 1957, Ser. No. 689,850
10 Claims. (Cl. 317—148)

This invention relates to circuits for comparing electric signals and, more particularly, to circuits for detecting differences in signal magnitudes.

An object of the invention is to provide a signal comparing circuit for detecting differences in magnitude exceeding a predetermined limit between two signals being compared.

Another object of the invention is to provide a circuit for continuously monitoring a control system.

Another object of the invention is to provide a signal comparing circuit having a high degree of accuracy and dependability.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawing is for illustration purposes only and is not to be construed as defining the limits of the invention.

Figure 1:
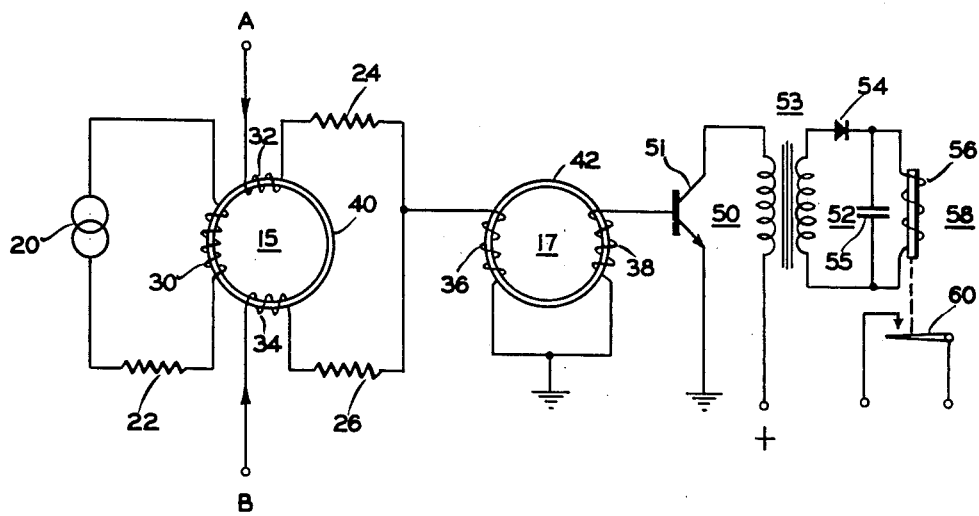

In the drawing:

FIGURE 1 is a schematic diagram of a comparison circuit constructed in accordance with the invention; and FIGURE 2 is a block diagram of a signal monitoring system using the comparison circuit of FIGURE 1.

A novel comparison circuit 9, constructed according to the invention, is shown in detail in FIGURE 1 and comprises a saturable transformer or inductive means 15 having a core 40 of magnetic material with a primary winding 30 thereon connected in series with a resistor 22 to an alternating current source 20. Resistor 22 is sufficiently large so that alternating current of substantially constant amplitude is supplied to primary winding 30 regardless of any impedance changes which may take place in primary winding 30.

Two secondary windings 32 and 34 on core 40 are connected through blocking resistors 24 and 26, respectively, to one end of a grounded primary winding 36 on a core 42 of magnetic material of a transformer 17. Secondary windings 32 and 34 are wound on core 40 and are connected so that, when primary winding 30 is energized by source 20, alternating currents induced in windings 32 and 34 are of the same phase and are added together in primary winding 36 of transformer 17 and induce a voltage in a grounded secondary winding 38 wound on core 42 of transformer 17. The secondary winding 38 is connected to an amplifier 50, including a transistor 51, for amplifying the voltage across winding 38, and the amplified voltage is applied through a transformer 53 to a rectifier and time delay circuit 52, including a diode 54 and a condenser 55, to the solenoid 56 of a relay 11 to close switch contacts 60.

Direct current signals A and B, being compared, are applied to secondary windings 32 and 34, respectively, of transformer 15 with their polarities opposing so that the direct current signals are subtracted from one another in primary winding 36 of transformer 17. Windings 32 and 34 are wound on core 40 so that the signals produce opposing direct current flux in core 40. With this arrangement, the direct current flux produced in cores 40 and 42 corresponds to the difference in magnitudes of the signals. When the signals are of equal magnitude, or when both signals are zero, the flux produced in core 40 by signal current A in winding 32 is equal and opposite to the flux produced in core 40 by signal current B in winding 34, and no direct current flux is produced in core 42 of transformer 17 so that the circuit will operate as described above with relay contacts 60 closed. With unequal signals A and B, the permeability of cores 40 and 42 decreases with increase in direct current flux in the cores and this results in a decrease in the impedance of primary windings 30 and 36. Since the current in winding 30 is substantially constant, the decrease in winding impedance results in a lower voltage being induced in secondary windings 32 and 34 of transformer 15 and in secondary winding 38 of transformer 17 so that switch contacts 16 of relay 11 open when the difference in magnitude of signals A and B exceeds a predetermined limit. Time delay circuit 52 is provided to prevent contacts 60 from opening due to transient circuit conditions.

FIGURE 2 shows a block diagram of a circuit for comparing two alternating current signals of the same phase or of opposite phase from sources A' and B'. Signal A' may be a summation of several aircraft autopilot command signals and signal B' may be a follow-up signal corresponding to the position of a control surface of the craft actuated in response to the summation signal. For proper operation of the autopilot, signals A' and B' should be equal in amplitude and opposite in phase. The comparing circuit will detect a variation in amplitude of the signals.

Signals A' and B' are applied to any suitable phase sensitive demodulator and filter circuits 5 and 7, respectively, to provide direct current outputs corresponding in polarity and magnitude to the phase and amplitude of signals A' and B'. The demodulated signals from circuits 5 and 7 are applied to comparing circuit 9, as shown schematically in FIGURE 1 and described in detail above, to detect a difference in amplitude of the signals within predetermined limits. When the signals correspond to one another in amplitude, comparing circuit 9 energizes relay 11 through amplifier and time delay circuit 10. If the variation in amplitude exceeds the predetermined limit, then the contacts of relay 11 open, as described above.

If alternating current signals A' and B', being compared, are of the same phase, then the signals are inverted in circuits 5 and 7 before applying the demodulated signals to comparing circuit 9.

The arrangement described detects differences in amplitude between two signals being compared and may be used for continually monitoring a control system, such as an autopilot system, in the manner described. The arrangement is highly accurate and dependable.

Although but a single embodiment of the invention has been illustrated and described in detail, it is to be expressly understood that the invention is not limited thereto. As hereinbefore indicated, various changes may also be made in the design and arrangement of the parts without departing from the spirit and scope of the invention as the same will now be understood by those skilled in the art.

I claim:

1. A device for detecting a difference in the magnitudes of two direct current signals comprising first saturable inductive means energized by an alternating current and by the direct current signals to be compared and having an output, the direct current signals being applied to the first inductive means so that the impedance of the first inductive means varies as a function of the difference in the magnitudes of the signals to vary the output accordingly and provide an alternating current output when the magnitude of the signals substantially correspond, second saturable inductive means connected to said first inductive means and energized by the direct current signals and the alternating current output, the direct current signals being applied to the second inductive means so that the impedance of the second inductive means varies as a function of the difference in magnitude of the signals to vary the output accordingly and provide an alternating current output when the magnitude of the signals substantially correspond, and means connected to the output of said second inductive means and operable when the difference in magnitudes of the signals exceeds a predetermined limit.

2. A device for detecting a difference in the magnitudes of two direct current signals comprising a saturable transformer having a core of magnetic material with a primary winding energized by an alternating current source and a pair of secondary windings each energized by one of the direct current signals, the secondary windings being wound on the core and being connected so that the currents induced in the secondary windings by the alternating current source are added together, the direct current signals being applied to the secondary windings with their polarities opposing, and means connected to the secondary windings and responsive to the resultant alternating current for detecting a difference in amplitude between the direct current signals.

3. A device for detecting a difference in the magnitude of two direct current signals, comprising a first saturable transformer having a core of magnetic material with a primary winding energized by an alternating current source and a pair of secondary windings each energized by one of the direct current signals, the secondary windings being wound on the core and being connected so that the currents induced in the secondary windings by the alternating current source are added together, the direct current signals being applied to the secondary windings with their polarities opposing, a second saturable transformer having a primary winding connected to the secondary windings of the first transformer and having a secondary winding, and means connected to the secondary winding of the second transformer and operated when the difference in magnitude of the signals exceeds a predetermined limit.

4. A device for detecting a difference in the magnitude of two direct current signals, comprising a first saturable transformer having a core of magnetic material with a primary winding energized by an alternating current source and a pair of secondary windings each energized by one of the direct current signals, the secondary windings being wound on the core and being connected so that the currents induced in the secondary windings by the alternating current source are added together, the direct current signals being applied to the secondary windings with their polarities opposing, a second saturable transformer having a primary winding connected to the secondary windings of the first transformer and having a secondary winding, a time delay circuit connected to the secondary winding of the second transformer, and a relay connected to the time delay circuit and energized when the difference in amplitude of the signals does not exceed a predetermined limit and deenergized when the difference in amplitude exceeds a predetermined limit.

5. A device for detecting a difference in amplitudes of two direct current signals, comprising a first saturable transformer having a core of magnetic material with a primary winding energized by an alternating current source and a pair of secondary windings each energized by one of the direct current signals, a second saturable transformer having a magnetizable core with a primary winding connected to the secondary windings of the first transformer so that the currents induced in the secondary windings by the alternating current source are added together in the primary winding of the second transformer, the direct current signals being applied to the windings so that the direct current signals are subtracted from one another in the primary winding of the second transformer and produce a direct current flux in the core of the second transformer corresponding to the difference in amplitudes of the signals, a secondary winding on the core of the second transformer, a time delay circuit connected to the secondary winding of the second transformer, and a relay connected to the time delay circuit and energized when the difference in amplitude of the signals does not exceed a predetermined limit and deenergized when the difference in amplitude exceeds the predetermined limit.

6. A device for detecting a difference in the amplitudes of two alternating current signals, comprising means receiving the signals for converting each of the signals to direct current corresponding in polarity to the phase of the alternating current signal, a saturable transformer having a core of magnetic material with a primary winding energized by an alternating current source and a pair of secondary windings each energized by one of the direct currents, the secondary windings being wound on the core and being connected so that the currents induced in the secondary windings by the alternating current source are added together, the direct current signals being applied to the secondary windings to produce opposing flux in the core, and means connected to the secondary windings and operated when the difference in amplitude of the alternating current signals exceeds a predetermined limit.

7. A device for detecting a difference in the amplitudes of two alternating current signals, comprising demodulating means energized by the signals, a first saturable transformer having a core of magnetic material with a primary winding energized by an alternating current source and a pair of secondary windings each energized by one of the demodulated signals, the secondary windings being wound on the core and being connected so that the alternating currents induced in the secondary windings by the alternating current source are added together, the demodulated signals being applied to the secondary windings to produce opposing flux in the core, a second saturable transformer having a primary winding connected to the secondary windings of the first transformer and having a secondary winding, a time delay circuit connected to the secondary winding of the second transformer, an a relay connected to the time delay circuit and operated when the difference in amplitudes of the alternating current signals exceeds a predetermined limit.

8. Means for detecting differences in the amplitudes of two direct current signals, comprising a pair of saturable inductive devices connected serially together and energized by the direct current signals so that the impedances of the devices vary as a function of the differences in amplitudes of the signals, said devices being adapted for energization by an alternating current and providing an alternating current output in accordance with their impedances, and means connected to said devices and operable in response to the output when the difference in amplitudes of the signals exceeds a predetermined limit.

9. Means for detecting differences in the amplitudes of two direct current signals, comprising first and second saturable inductive devices connected together with an input of the second device connected to an output of the first device, said devices being energized by the direct current signals so that the impedances of the devices vary as a function of the difference in amplitudes of the signals, said first device being adapted for energization by an alternating current and said devices providing an alternating current output in accordance with their impedances, and means connected to said second device and operable in response to the alternating current output when the difference in amplitudes of the signals exceed a predetermined limit.

10. Means for detecting differences in the amplitudes of two direct current signals, comprising a first saturable transformer having a core of magnetic material with a primary winding energized by an alternating current source and a pair of secondary windings each energized by one of the direct current signals, the secondary windings being wound on the core so that the currents induced in the secondary windings by the alternating current source are added together and being connected so that the direct current signals produce opposing flux in the core, a second saturable transformer having a primary winding connected to the secondary windings of the first transformer and energized by the direct current signals in opposing relationship and by the induced alternating currents, said second saturable transformer having a secondary winding, and means connected to the secondary winding of the second transformer and operated when the differences in amplitudes of the signals exceed a predetermined limit.

References Cited in the file of this patent

UNITED STATES PATENTS

| | | |
|---|---|---|
| 2,149,092 | Kettler | Feb. 28, 1939 |
| 2,584,856 | Fitz Gerald | Feb. 5, 1952 |
| 2,649,557 | Ransom | Aug. 18, 1953 |
| 2,774,932 | Patton | Dec. 18, 1956 |
| 2,819,442 | Goodrich | Jan. 7, 1958 |
| 2,849,662 | Britten | Aug. 26, 1958 |